(12) United States Patent
Babbs et al.

(10) Patent No.: US 8,567,108 B1
(45) Date of Patent: Oct. 29, 2013

(54) FISHING ROD HOLDER WITH HOOK SETTING CAPABILITY

(76) Inventors: Ronald J. Babbs, Grovertown, IN (US); Diane Babbs, Grovertown, IN (US)

(*) Notice: Subject to any disclaimer, the term of this patent is extended or adjusted under 35 U.S.C. 154(b) by 385 days.

(21) Appl. No.: 12/977,128

(22) Filed: Dec. 23, 2010

(51) Int. Cl.
*A01K 97/10* (2006.01)
*A01K 97/11* (2006.01)

(52) U.S. Cl.
USPC .............................................. 43/15; 43/21.2

(58) Field of Classification Search
USPC ..................................................... 43/15, 21.2
See application file for complete search history.

(56) References Cited

U.S. PATENT DOCUMENTS

| | | | | |
|---|---|---|---|---|
| 2,661,563 A | * | 12/1953 | Humphries et al. | 43/16 |
| 2,689,426 A | * | 9/1954 | Baenen | 43/15 |
| 2,781,600 A | * | 2/1957 | McDonnell | 43/15 |
| 3,475,847 A | * | 11/1969 | Wilson | 43/15 |
| 3,660,921 A | * | 5/1972 | McDonnell | 43/15 |
| 3,881,269 A | * | 5/1975 | Timmons | 43/15 |
| 4,031,651 A | | 6/1977 | Titze | |
| 4,197,668 A | * | 4/1980 | McKinsey | 43/15 |
| 4,219,955 A | * | 9/1980 | Lo Bosco | 43/15 |
| 4,344,248 A | | 8/1982 | Brophy, Sr. et al. | |
| 4,397,113 A | | 8/1983 | Pinson | |
| 4,486,968 A | * | 12/1984 | Gould | 43/15 |
| 4,676,018 A | * | 6/1987 | Kimball | 43/15 |
| 5,050,332 A | * | 9/1991 | Cross | 43/15 |
| 5,076,001 A | | 12/1991 | Coon et al. | |
| 5,383,298 A | | 1/1995 | Engel | |
| 5,524,376 A | | 6/1996 | Flisak | |
| 5,542,205 A | | 8/1996 | Updike | |
| 5,873,191 A | | 2/1999 | Bova et al. | |
| 6,088,946 A | * | 7/2000 | Simmons | 43/15 |
| 6,094,851 A | | 8/2000 | Guidry | |
| 6,336,287 B1 | * | 1/2002 | Lobato | 43/16 |
| 6,430,864 B1 | | 8/2002 | Thomure et al. | |
| 6,446,379 B1 | * | 9/2002 | James | 43/17 |
| 7,017,296 B2 | | 3/2006 | Templeman et al. | |
| 7,377,069 B2 | * | 5/2008 | Morris | 43/15 |

\* cited by examiner

*Primary Examiner* — David Parsley
(74) *Attorney, Agent, or Firm* — Montgomery Patent & Design, LLC; Robert C. Montgomery (57) ABSTRACT

A device for automatic setting of a hook for use with an existing fishing rod comprises a base, a holder, and a trigger mechanism. The base comprises a weighted bottom portion and adjustable leg portions which provide stability to an existing fishing rod. The fishing rod is held at an angled position on the base via insertion of a handle portion into a tubular receiver. The holder mechanism comprises an adjustable-force coil spring for setting the hook. Furthermore, the trigger mechanism allows a user to place a rod in the holder and selectively adjust the tension required to release the trigger, such that a force applied by a hooked fish will cause the trigger to release, thereby allowing the coil spring to pull the rod upright to set the hook in the fish's mouth.

10 Claims, 8 Drawing Sheets

FISHING ROD HOLDER WITH HOOK SETTING CAPABILITY

RELATED APPLICATIONS

The present invention was first described in a notarized Official Record of Invention on Jan. 25, 2010, that is on file at the offices of Montgomery Patent and Design, LLC, the entire disclosures of which are incorporated herein by reference.

FIELD OF THE INVENTION

The present invention relates generally to fishing rod holders, and in particular, to a fishing rod holder adapted to automatically set a hook when the hook is engaged by a fish.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish in a shorter period of time.

One (1) method for catching more fish over a given time period is to utilize multiple fishing rods simultaneously to increase the likelihood of a fish encountering a lure and bait and biting one (1) of those lines. While there are a multitude of fishing rod holders on the market, they generally require a fisherman to react fast enough to retrieve the rod from the holder to set the hook in time to prevent the fish from getting away.

Various attempts have been made to provide fishing rod holders with hook setting mechanisms. Examples of these attempts can be seen by reference to several U.S. patents. U.S. Pat. No. 4,031,651, issued in the name of Titze, describes a fishing rod holder and automatic hook setter including a vertical standard support and a tubular sleeve holder.

U.S. Pat. No. 4,344,248, issued in the name of Brophy, Sr., et al., describes n automatic hook setting fishing rod holder including a holder arm with a forward portion extending on a side for receiving a handle of a fishing rod.

U.S. Pat. No. 4,397,113, issued in the name of Pinson, describes a fishing rod holder and hook setting device adaptable for stationary use or trolling.

U.S. Pat. No. 5,076,001, issued in the name of Coon et al., describes a spring loaded fishing pole holder apparatus including an adjustable latching unit.

U.S. Pat. No. 5,524,376, issued in the name of Flisak, describes a fishing rod holder and hook-setter including a safety catch which blocks a latch during setting to protect the fisherman from accidental actuation of the hook setting mechanism.

U.S. Pat. No. 6,430,864, issued in the name of Thomure et al., describes an automatic hook set fishing rod holder including an adjustably tension-biased triggering mechanism and a clamp fastening and mounting means.

While these apparatuses fulfill their respective, particular objectives, each of these references suffer from one (1) or more of the aforementioned disadvantages. Many such apparatuses do not provide a desirable range of configurability and safety features for the hook setting mechanism. In addition, many such apparatuses are not adjustable and stabile in a manner suited for use along a variety of surfaces. Furthermore, many such apparatuses are difficult and time consuming to set up. Accordingly, there exists a need for a fishing rod holder with a hook setting mechanism without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a fishing rod holder and hook setting mechanism providing a wide range of adjustability and configurability to allow for use with a variety of rods and in a variety of locations in a manner which is simple to set up. Thus, the object of the present invention is to solve the aforementioned disadvantages and provide for this need.

To achieve the above objectives, it is an object of the present invention to provide automatic setting of a fish hook caught within a fish's mouth. The apparatus comprises a rod holder assembly, a weighted base assembly, a trigger mechanism, and a tensioning adjustment assembly.

Another object of the present invention is to facilitate use with an existing fishing rod by holding a handle of the fishing rod within the tubular rod holder assembly.

Yet still another object of the present invention is to provide stability to the apparatus during use by affixing the rod holder assembly to the base assembly which is elongate and weighted.

Yet still another object of the present invention is to allow a user to adjust the height of the apparatus utilizing a plurality of adjustable leg portions.

Yet still another object of the present invention is to provide additional stabilization of the apparatus during use as desired by utilizing a stake and an anchoring aperture located at a rear portion of the base.

Yet still another object of the present invention is to automatically set a hook within a fish's mouth when an initial downward force is applied by the fish to the fishing rod. The downward motioning of the fishing rod causes a rod holder tube of the rod holder assembly to pivot downwardly to contact a trigger extension portion of the trigger mechanism.

Yet still another object of the present invention is to pull upward and thereby set the hook within the fish upon actuation of the trigger mechanism. Contacting the trigger extension portion releases a trigger cable portion of the rod holder assembly which thereby causes the rod holder assembly to pivot upwardly due to a tension spring portion of the tension adjustment assembly.

Yet still another object of the present invention is to eliminate excess or unnecessary movement of the fishing rod within the rod holder tube during use by comprising a rod tightening fastener which applies a concentrated force directly to a handle portion of the fishing rod within the rod holder tube.

Yet still another object of the present invention is to control an amount of over-travel by the rod holder tube and fishing rod during activation to limit the arcuate travel of the rod for safety purposes. This is accomplished with a retaining strap which is looped around the rod holder tube in a loose-fitting manner.

Yet still another object of the present invention is to allow a user to vary the force produced by the tension spring portion of the tension adjustment assembly in order to adjust the force of the hook setting mechanism during use. This is accomplished by varying the length of tension spring portion along a spring bracket.

Yet still another object of the present invention is to provide a method of utilizing the device that provides a unique means of obtaining an instance of the apparatus, placing the apparatus on a desired ground surface, adjusting the adjustable leg portions to maintain levelness of the base assembly, anchoring the apparatus to the ground surface utilizing the stake and the anchoring aperture as desired, holding the rod holder assembly down at a horizontal position while attaching the trigger cable to the trigger mechanism, releasing the rod holder assembly, placing a fishing rod handle within the rod holder assembly and adjusting the tension spring portion of the tension adjustment assembly to a desired length, lifting the rod holder tube, removing the fishing rod, baiting and casting the fishing rod in a conventional manner, replacing the handle portion of the fishing rod within the rod holder tube, adjusting the rod tightening fastener, activating the trigger mechanism upon engagement by a fish, and removing the fishing rod from the apparatus as needed.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 fishing rod holder with hook setting capability
20 rod holder assembly
22 cradle
24 rod holder tube
26 resistance band
27 band opening
28 resistance band adjustment screw
30 rod tightening fastener
32 retaining strap
36 trigger cable
38 trigger opening
50 base assembly
52 base plate
54 front support leg
56 first adjustable leg portion
58 rear support leg
59 holder bracket
60 pivot fastener
62 trigger mounting bracket
64 spring bracket
66 anchoring aperture
70 trigger mechanism
72 trigger actuator
74 trigger extension
76 second adjustable leg portion
77 locking mechanism
78 adjusting aperture
80 tension adjustment assembly
82 spring
84 eyebolt
85 spring bracket aperture
86 tension cable
100 fishing rod
105 fishing line
110 ground surface
120 threaded fastener
125 rivet fastener
130 cable eyelet
135 wingnut
140 through bolt
145 anchoring stake

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fishing rod holder with hook setting capability (herein described as the "apparatus") 10, which provides automatic setting of a fish hook within a caught fish's mouth, for use with an existing fishing rod 100. The apparatus 10 comprises a pivoting spring-loaded rod holder assembly 20, a weighted base assembly 50, a trigger mechanism 70, and an adjustable tensioning adjustment assembly 80. In use, the existing fishing rod 100 is angled upwardly toward a body of water while being held within the tubular rod holder assembly 20. Said rod holder assembly 20 is pivotally affixed to the base assembly 50 which comprises an elongated weighted bottom portion which provides stability to the apparatus 10 during a fish catching event. The initial pull of a fish on a fishing line portion 105 of the fishing rod 100 activates the trigger mechanism 70 which in turn releases the rod holder assembly 20, thereby causing said rod holder assembly 20 to pivot upwardly and backwardly via a spring force. The backward motion of the fishing rod 100 enables effective setting a hook portion into the fish's mouth. Furthermore, the rod holder assembly 20 comprises a resistance band 26 which allows a user to selectively adjust an amount of initial "tugging" by the fish required to activate the trigger mechanism 70.

Figure 1:
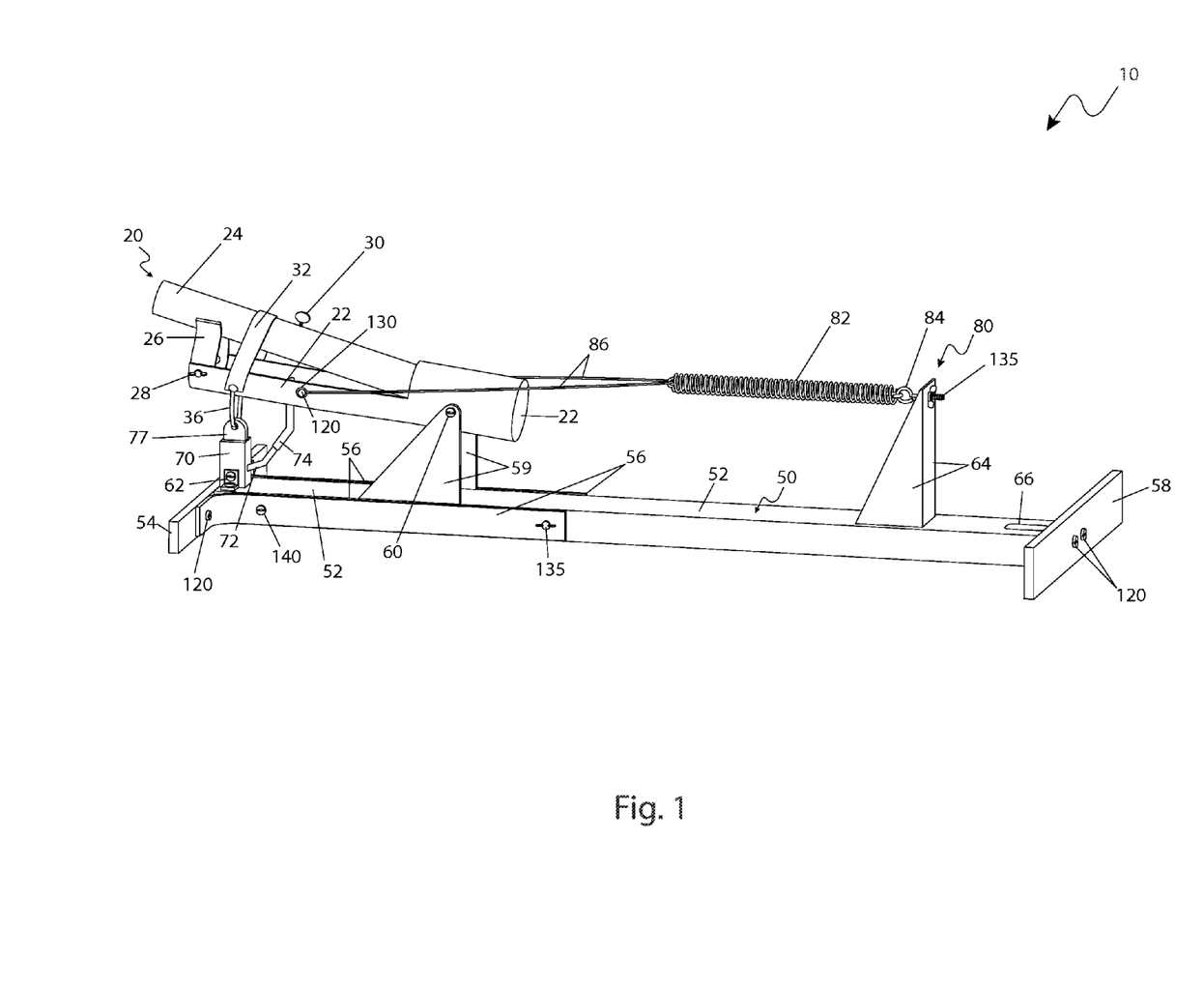
FIG. 1 is a side perspective view of a fishing rod holder with hook setting capability 10 depicting a pre-triggered state, according to a preferred embodiment of the present invention.
Figure 2:
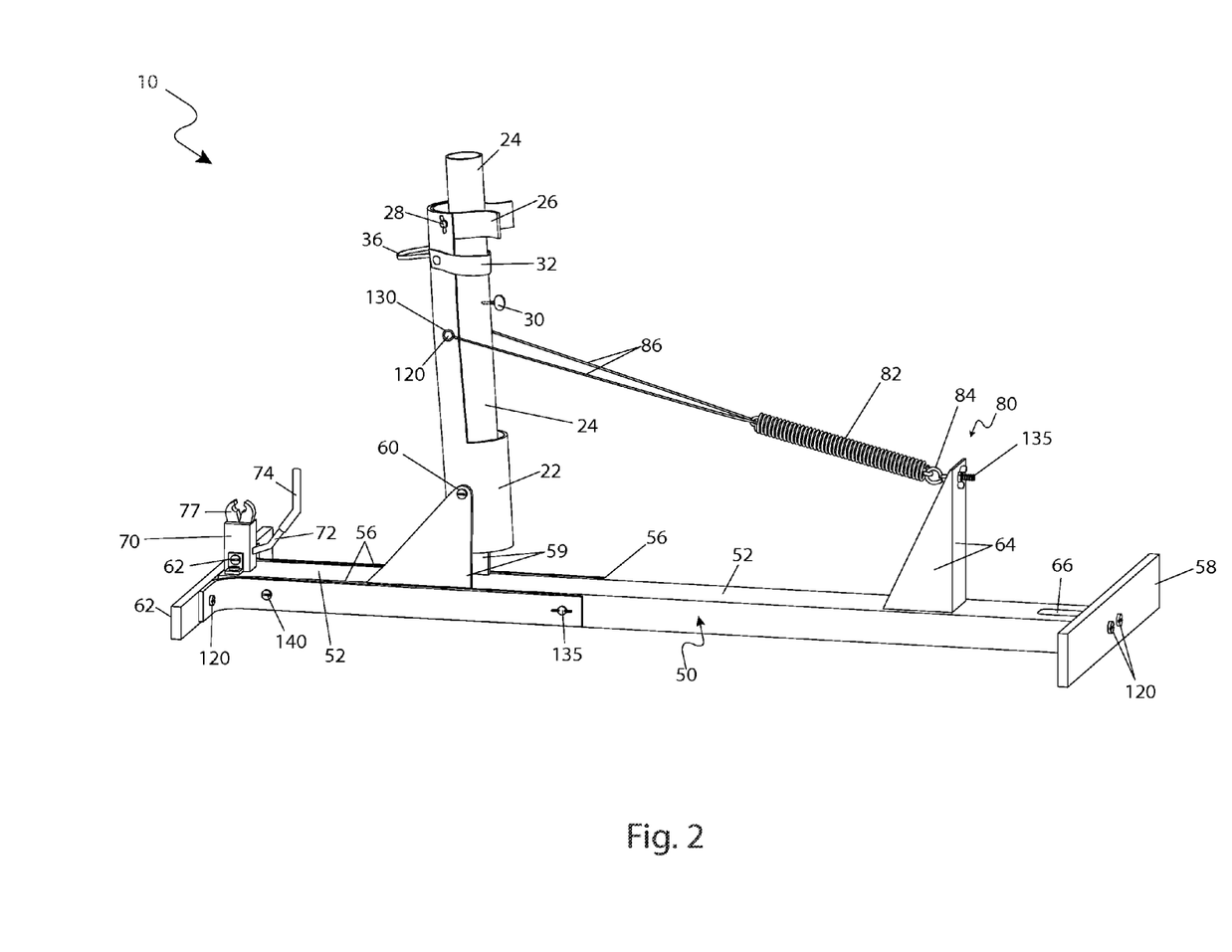
FIG. 2 is a side perspective view of the fishing rod holder with hook setting capability 10 depicting a post-triggered state, according to a preferred embodiment of the present invention.

Referring now to FIGS. 1 and 2, side perspective views of the apparatus 10 depicting pre-triggered and post-triggered states, according to a preferred embodiment of the present invention, are disclosed. The apparatus 10 comprises a rod holder assembly 20 being pivotingly attached to the base assembly 50 via an axial pivot fastener 60 supported along side portions by a pair of triangle-shaped holder brackets 59, preferably being welded to said base assembly 50 along outer parallel edges in a parallel arrangement being positioned slightly forward of center of said base assembly 50.

The rod holder assembly 20 further comprises a cradle 22, a rod holder tube 24, a resistance band 26, and a retaining strap 32. The cradle 22 comprises a generally horizontal half-cylinder form to support and position the superjacent rod holder tube 24. Said cradle 22 and rod holder tube 24 are pivotingly attached to each other at respective rear end portions, via a pivoting axial connection of the aforementioned pivot fastener 60 being inserted horizontally through both the cradle 22 and holder tube 24 portions. When setting the hook, said cradle 22 and holder tube 24 portions rotate rearwardly to an approximate vertical orientation before the rear portion of the cradle 22 contacts the base plate 52 and halts said rotation. Furthermore, said pivot fastener 60 enables a jointly combined pivoting relationship of said cradle 22 and rod holder tube 24 portions with respect to the subjacent base assembly 50. When in a "ready" state as illustrated in FIG. 1, prior to activation of the trigger mechanism 70, the resistance band portion 26 of the rod holder assembly 20 positions and supports a forward end of the rod holder tube 24 at a slight upward angle with respect to the cradle 22 so as to provide a gap between a trigger extension portion 74 of the trigger mechanism 70 and a bottom surface of the rod holder tube 24 (see FIGS. 4a and 4b).

Activation of the apparatus 100 to set a hook is caused by an initial downward force being applied by a fish to the fishing rod 100 being contained within the rod holder tube 24. Said rod holder tube 24 is consequently pulled downwardly until over-coming a flexible resistance provided by the resistance band 26, thereby being motioned downwardly into the subjacent cradle 22 (see FIG. 4b). Said convergence of said rod holder tube 24 downwardly into the cradle 22 causes mechanical contact between a bottom surface portion of the rod holder tube 24 and the trigger extension portion 74 of the trigger mechanism 70, thereby activating said trigger mechanism 70. Activation of said trigger mechanism 70 releases the trigger cable portion 36 of the rod holder assembly 20, thereby allowing said rod holder assembly 20 to pivot upwardly via a force being applied by a tension spring portion 82 of the tension adjustment assembly 80. Said backward motion results in a setting of the hook portion of the fishing rod 100 (see FIG. 3b). The cradle portion 22 of the rod holder assembly 20 is attached to said tension spring 82 via a tension cable 86. The tension cable 86 is looped through said tension spring 82 and anchored to opposing side surfaces of said cradle 22 via respective cable eyelets 130 and secured using threaded fasteners 120 (see FIGS. 4b and 6).

The base assembly 50 comprises a base plate 52, a front support leg 54, a pair of first adjustable legs 56, and a rear support leg 58. Said base assembly 50 comprises an "H"-shaped structure having the elongated and weighted metal or wood base plate 52 being positioned between, and affixed to the front 54 and rear 58 support legs using common threaded fasteners 120 (also see FIG. 5). Said support legs 54, 58 are arranged parallel to each other and parallel to a subjacent ground surface 110, thereby providing stable lateral and longitudinal positioning of the apparatus 10 upon said ground surface 110. Said front support leg 54 is height adjustable via a pair of second adjustable leg portions 76 (see FIG. 5).

The rod holder assembly 20, base assembly 50, and tension adjustment assembly 80 portions of the apparatus 10 are envisioned to be constructed using durable corrosion resistant materials such as stainless steel and plastics being capable of withstanding forces associated with catching a fish, as well as being unaffected by harsh environmental and weather conditions associated with sport fishing events.

Figure 3A:
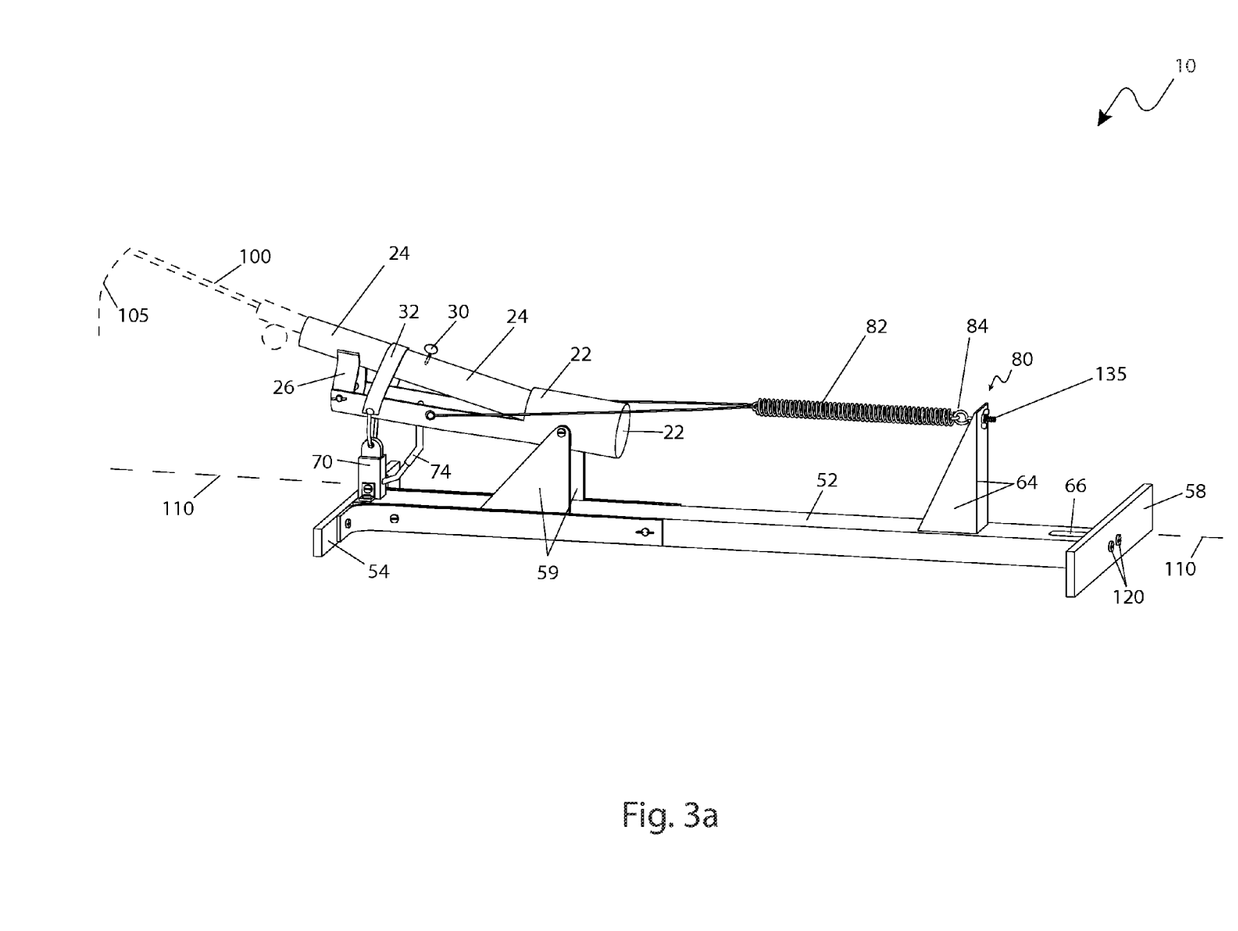
FIG. 3a is an environmental view of a fishing rod holder with hook setting capability 10 depicting a pre-triggered state, according to a preferred embodiment of the present invention.
Figure 3B:
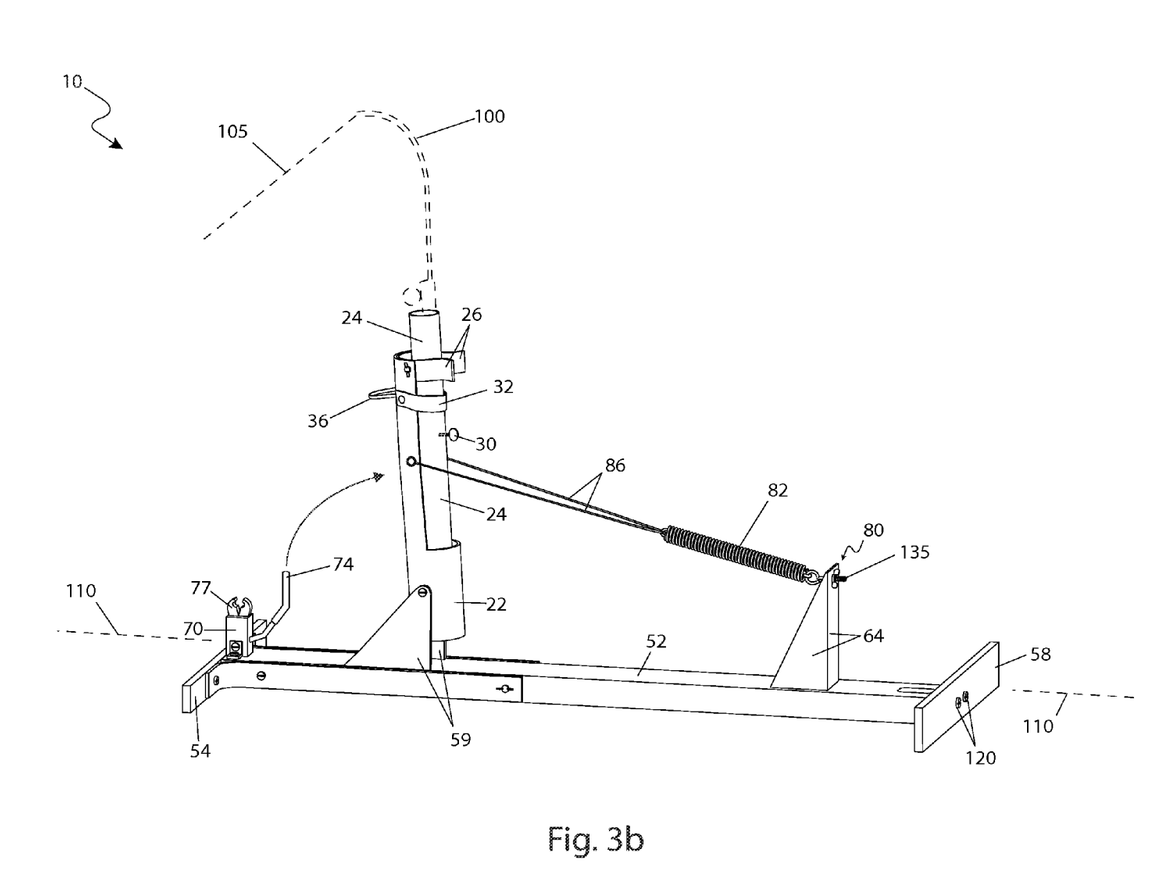
FIG. 3b is an environmental view of a fishing rod holder with hook setting capability 10 depicting a post-triggered state, according to a preferred embodiment of the present invention.

Referring now to FIGS. 3a and 3b, environmental views of the apparatus 10 depicting pre-triggered and post-triggered states, according to a preferred embodiment of the present invention, are disclosed. The apparatus 10 is depicted here in both states to illustrate the automatic transition from the fishing rod 100 being secured at an angle slightly above a horizontal plane, to a vertical orientation resulting from spring-loaded activation of the apparatus 10 by a caught fish which activates the trigger mechanism 70 and allows the force applied by the spring 82 to motion the rod holder assembly 20 upwardly as previously described. In this manner, a user need not constantly hold the fishing rod 100 or even be present during a fish catching event while utilizing the apparatus 10.

Figure 4A:
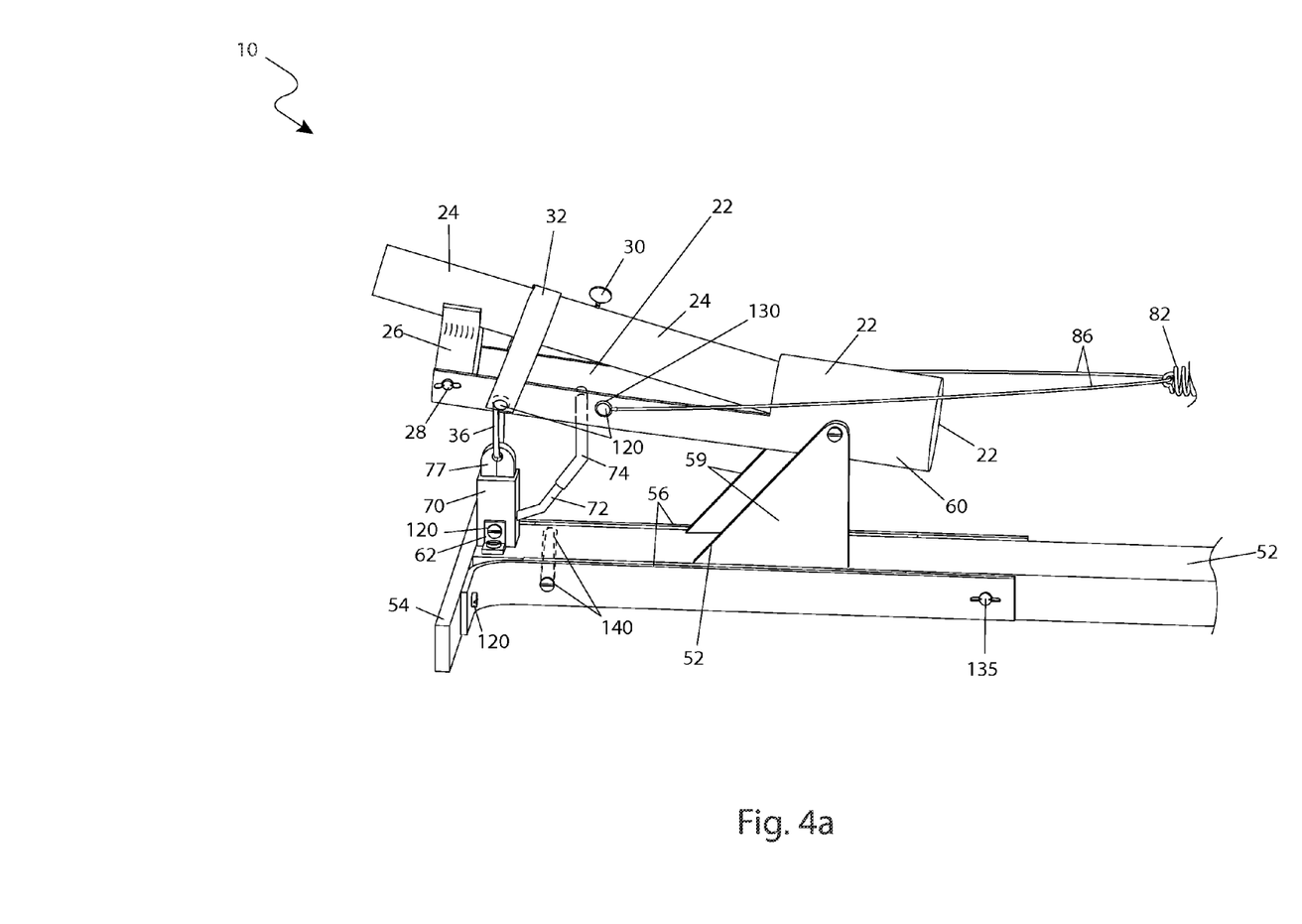
FIG. 4a is a close-up view of a fishing rod holder assembly portion 20 of the fishing rod holder with hook setting capability 10, according to a preferred embodiment of the present invention.
Figure 4B:
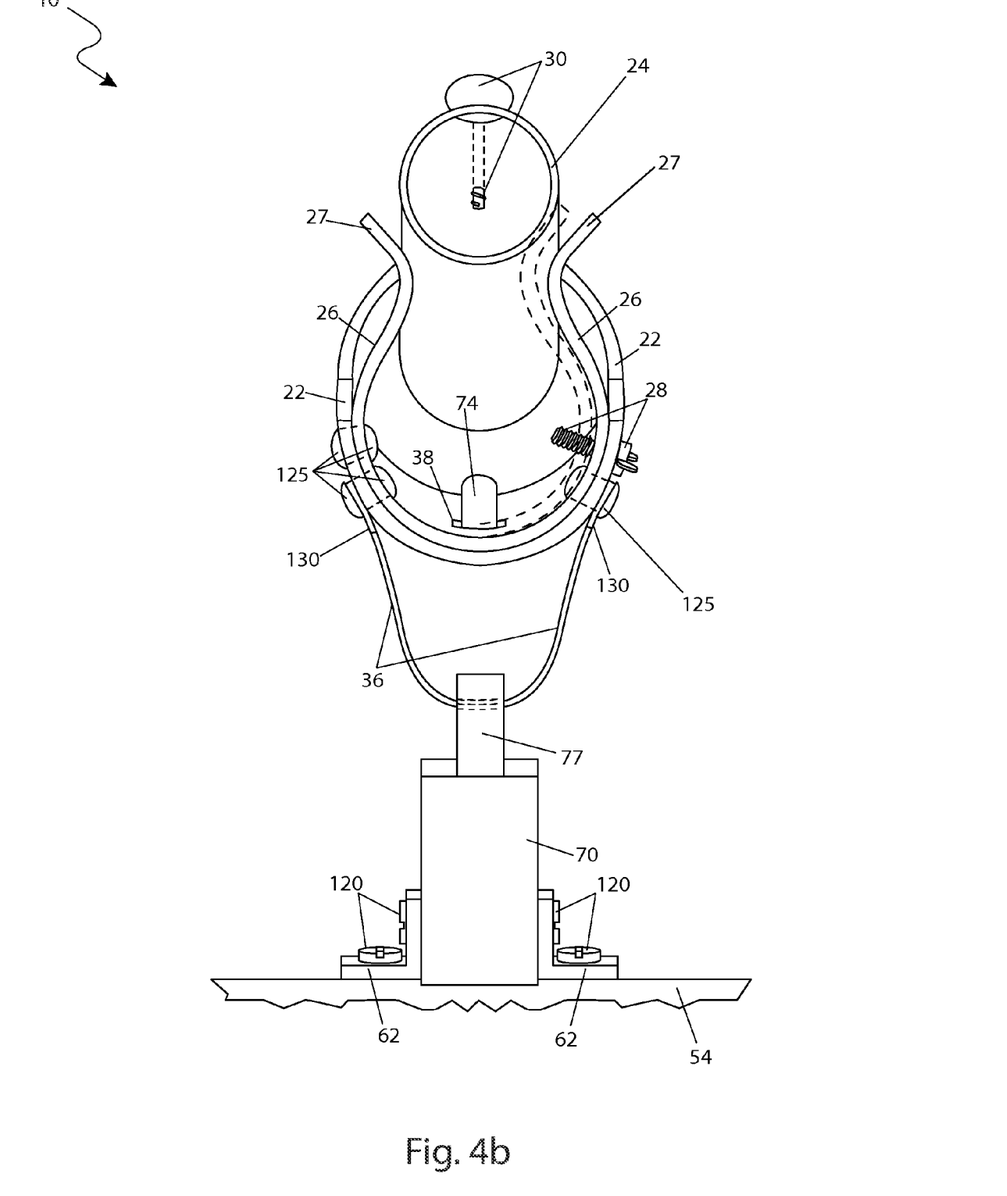
FIG. 4b is a front view of the fishing rod holder with hook setting capability 10, according to a preferred embodiment of the present invention.

Referring now to FIGS. 4a and 4b, side and front close-up views of a fishing rod holder assembly portion 20 of the apparatus 10, according to a preferred embodiment of the present invention, are disclosed. The fishing rod holder assembly 20 further comprises a resistance band 26, a resistance band adjustment screw 28, a fishing rod tightening fastener 30, a retaining strap 32, a trigger cable 36, and a trigger mechanism 70.

The resistance band 26 comprises a "C"-shaped metal member having an open top portion 27. Said resistance band 26 is to be made using a springing metal material providing excellent metallurgical memory and being capable of returning to an expanded form against the inner surface of the cradle 24. Said resistance band 26 further comprises an upwardly facing band opening 27 which acts as a rest for the rod holder tube 24 upon upper edges of said band opening 27. Said resistance band 26 also comprises a resistance band adjustment screw 28 which provides a user a means to widen or narrow said band opening 27, thereby varying a resultant interfering force required to motion said rod holder tube 24 downwardly through said band opening 27 and into the cradle 22 during an initial striking of a fish on the fishing line 105. Said resistance band 26 is to be rigidly affixed along one (1) side portion thereto an inner side surface of the cradle 22 using a plurality of rivet fasteners 125 or equivalent fastening means. The opposing side portion of the resistance band 26 is then free to flex inwardly as acted upon by the impinging resistance band adjustment screw 28. Said band adjustment screw 28 is envisioned to comprise a threaded thumb screw being threadingly engaged and passing through a wall portion of said cradle 22 and contacting said resistance band 26 in a perpendicular manner, thereby motioning a side portion of said resistance band 26 so as to open or close the band opening portion 27.

The rod tightening fastener 30 provides a means to eliminate excess movement of the fishing rod 100 within the rod holder tube 24. Said rod tightening fastener 30 is envisioned to comprise a common threaded thumb screw being threadingly engaged and passing through an upper wall portion of said rod holder tube 24, thereby applying a concentrated force directly to a handle portion of the fishing rod 100.

The cradle portion 22 of the rod holder assembly 20 comprises a "U"-shaped trigger cable 36 which is affixed to and hangs downwardly from side surfaces of said cradle 22 and attached using standard cable eyelets 130 and common rivet fasteners 125 or equivalent fastening means. Said trigger cable 36 comprises a length of common braded wire-rope further comprising common crimped cable eyelets 130 affixed to end portions to provide a securing means. The trigger cable 36 provides a removably attachable connection to a locking mechanism portion 77 of the subjacent trigger mechanism 70, thereby providing a downward anchoring of the rod holder assembly 20 in the "ready" position. Upon catching a fish, the trigger cable 36 is released by the trigger mechanism 70, thereby allowing the rod holder assembly 20 to pivot upwardly under spring tension as previously described.

The apparatus 10 also comprises a retaining strap 32 comprising a flexible "U"-shaped rubber device affixed to the cradle 22 along opposing side surfaces using threaded fasteners 120 and looping up and around the rod holder tube 24 in a loose-fitting manner. Said retaining strap 32 provides a means to control an amount of over-travel by the rod holder tube 24 and included fishing rod 100 during activation, thereby limiting the arcuate travel of said rod holder tube 24 and fishing rod 100 to an approximate vertical position (see FIG. 3b).

The trigger mechanism 70 comprises a commercially available archery release unit capable of being mounted to a horizontal surface of the base plate 52. Said trigger mechanism 70 is further envisioned to be similar to release mechanisms used in the construction of archery equipment such as crossbows. The trigger mechanism 70 further comprises expected features including a pin-type or jaw-type locking mechanism 77 at a top location, a rigid rectangular body being stationarily mounted to said base plate 52, and a rearwardly protruding trigger actuator 72. Said trigger mechanism 70 is to be affixed to the base plate 52 via a pair of right-angle metal trigger mounting brackets 62 attached along side surfaces of the trigger mechanism 70 and said base plate 52 using a plurality of common threaded fasteners 120. The trigger actuator 72 is to be in mechanical communication with said locking mechanism 77, thereby causing a corresponding unlocking of the locking mechanism 77 upon pressing downwardly upon the trigger actuator 72 in a conventional manner. The trigger actuator 72 is in turn inserted into a tubular trigger extension 74 which communicates a motion of the trigger actuator 72 upwardly into the cradle 22. Said trigger extension 74 extends upwardly through a rectangular trigger opening 38 being machined or formed through a bottom portion of the cradle 22, therefore protruding into an inner space of the cradle 22. During a fish catching event, the rod holder tube 24 descends through the band opening 27 and contacts the trigger extension 74. The downward motion of the trigger extension 74, and connected trigger actuator 72, causes the locking mechanism 77 to release the trigger cable 36 allowing the rod holder assembly 20 to pivot upwardly due to tension being applied by the tension cable 86 and spring 82.

Figure 5:
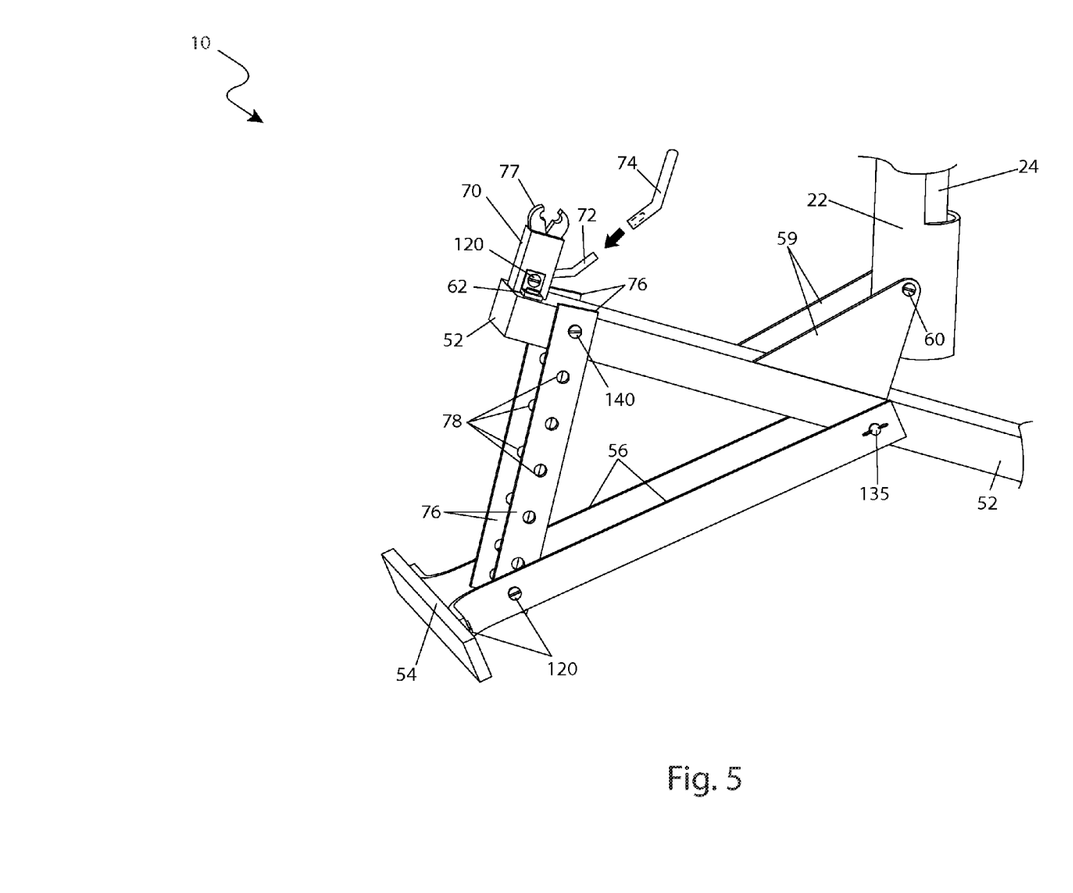
FIG. 5 is a close-up view of extended first adjustable leg portions 56 of the fishing rod holder with hook setting capability 10, according to a preferred embodiment of the present invention; and, FIG. 6 is a side view of the fishing rod holder with hook setting capability 10 depicting spring adjusting and anchoring portions, according to a preferred embodiment of the present invention.

Referring now to FIG. 5, a close-up view of extended first adjustable leg portions 56 of the apparatus 10, according to a preferred embodiment of the present invention, is disclosed. The apparatus 10 provides a height adjustable means to compensate for a slope when placed upon a sloped ground surface 110. The apparatus 10 comprises a pair of first adjustable leg portions 56 and a pair of second adjustable leg portions 76. The adjustable leg portions 56, 76 allow a user to maintain a level attitude of the base plate 52 by providing a strong triangle-shaped structure between the base plate 52 and the front leg support 54, thereby elevating a front portion of the base assembly 50 and the rod holder assembly 20. Said second adjustable leg portions 76 each comprise at least five (5) equally-spaced adjusting apertures 78, thereby providing selection of several heights of said front support leg 54. Said adjustable leg portions 56, 76 comprise flat metal stock approximately one (1) inch wide.

In an event the apparatus 10 is utilized on flat ground, the first 56 and second 76 adjustable leg portions are to be secured in a stowed state along side surfaces of the base plate 52 using common fasteners, being shown here using wingnuts 135 at a rear end portion, and threaded fasteners 120 at a front position. If utilizing the apparatus 10 along a sloped ground surface 110, said first 56 and second 76 adjustable leg portions may be selectively deployed downwardly by removing the aforementioned wingnuts 135 and threaded fasteners 120, positioning said first 56 and second 76 adjustable leg portions to a desired height. Said leg portions 56, 76 may be secured in position by reinstalling the threaded fasteners 120 through the first adjustable leg portions 56 and corresponding adjustment aperture portions 78, and reinstalling and tightening the remaining threaded fasteners 120 and wingnuts 135 to secure the apparatus 10 at a desired height.

Figure 6:
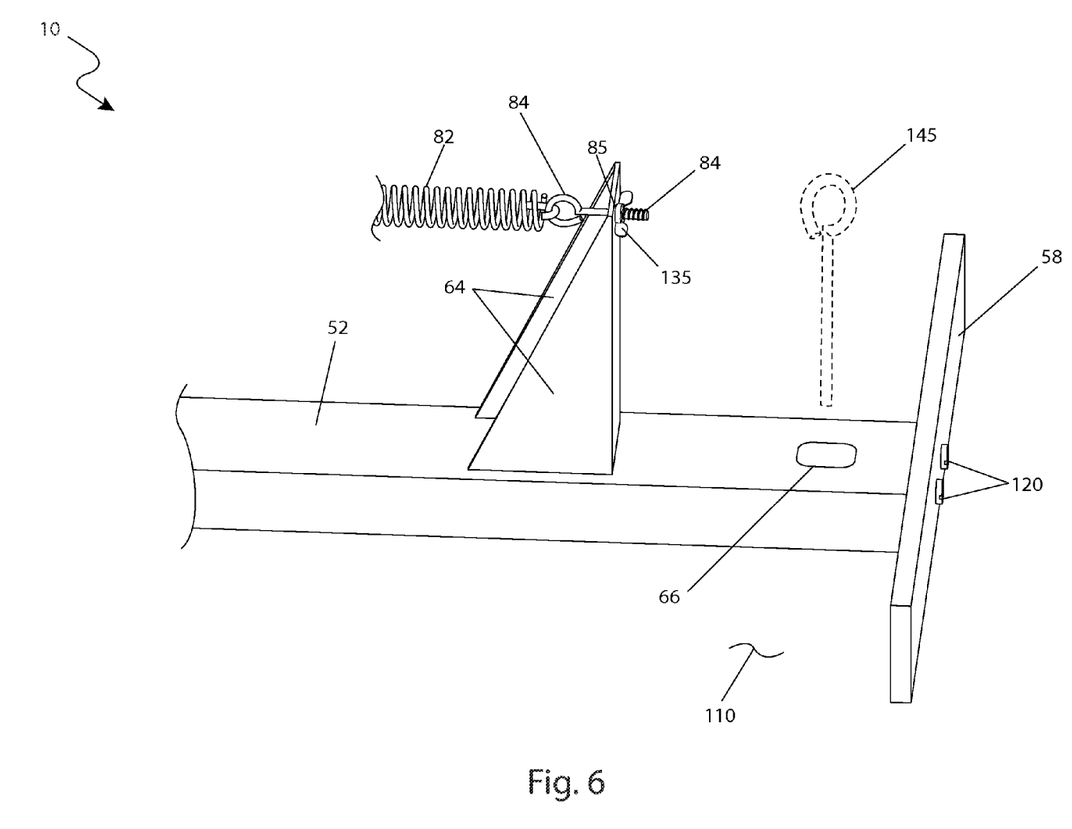

Referring now to FIG. 6, a side view of the apparatus 10 depicting spring adjusting and anchoring portions of the apparatus 10, according to a preferred embodiment of the present invention, is disclosed. Said upward pivoting motion of the rod holder assembly 20 is powered via attachment to and tension from a large coil spring 82 being affixed to the cradle 22 via a tension cable 86 as previously described (see FIGS. 1 and 2). The apparatus 10 provides a means to adjust a length of the spring 82, thereby varying the force produced by the spring 82 which in turn acts upon the rod holder assembly 20. The tension adjustment assembly 80 comprises an anchoring spring bracket 64, a threaded eyebolt 84, and a wingnut 135. The spring bracket 64 comprises a strong one (1) piece metal fixture having a "U"-shaped base being affixed to outer edges of the base plate 52 preferably using welding or equivalent permanent attachment methods. Said spring bracket 64 further comprises vertical triangular side panels and a connecting rectangular rear surface which comprises a drilled spring bracket aperture 85 which provides an attachment means to said eyebolt 84 being inserted therethrough and secured using the wingnut 135. The force produced by the spring 82 may be varied by positioning the eyebolt 84 with respect to the spring bracket 64 and secured using the wingnut 135, thereby changing a length of said spring 82 and an amount of tension transmitted to the rod holder assembly 20. Said adjustability of the tension of the spring 82 allows a user customize the dynamic motion of the fishing rod 100 during the hook-setting action based upon particular characteristics of a fish to be caught.

Additionally, the apparatus 10 provides a means of anchoring to a ground surface 110 via an anchoring aperture 66 which is located at a rear portion of the base plate 52. Said anchoring aperture 66 comprises an oval, or similarly shaped machined vertical hole having sufficient size so as to facilitate insertion of a common metal or plastic stake 145, being subsequently driven to a sufficient depth into said ground surface 110, thereby providing improved stabilization of the apparatus 10 during use.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 1 through 6.

The method of installing the apparatus 10 may be achieved by performing the following steps: procuring the apparatus 10; placing the apparatus 10 upon a ground surface 110; deploying and adjusting and securing the first 56 and second 76 adjustable leg portions as needed to maintain levelness of the base plate 52, if the apparatus 10 is placed upon a sloped surface; installing a common stake 145 through the anchoring aperture 66 and into the ground surface 110 to provide additional stability; removing the trigger extension 74 from the trigger actuator 72; manually pushing the rod holder assembly 20 downward to a generally horizontal position and holding said rod holder assembly 20 down while attaching said trigger cable 36 to the trigger mechanism 70; motioning the trigger actuator 72 downwardly to open the locking mechanism 77; placing the trigger cable 36 into the locking mechanism 77; releasing the trigger actuator 72 to close the locking mechanism 77 around the trigger cable 36; releasing the rod holder assembly 20; lifting the rod holder tube 24 until said rod holder tube 24 is resting upon the band opening portion 27 of the resistance band 26; placing a handle portion of the fishing rod 100 into the rod holder tube 24; adjusting the resistance band adjustment screw 28, based upon a combined weight of the rod holder tube 24 and fishing rod 100, until said rod holder tube 24 is resting in a stable manner upon the band opening portion 27 of the resistance band 26; removing the fishing rod 100 from the rod holder tube 24; and, adjusting the eyebolt 84 and wingnut 135 portions of the tension adjustment assembly 80 to customize a length of the spring 82 based upon a desired hook-setting motion. The apparatus 10 is now ready for fishing.

The method of utilizing the apparatus 10 for catching fish may be achieved by performing the following steps: baiting and casting the existing fishing rod 100 apart from the apparatus 10 in a conventional manner; reinserting the handle portion of the fishing rod 100 into the rod holder tube 24; tightening the rod tightening fastener 30 until said fishing rod is held securely within the rod holder tube 24; adjusting the resistance band adjustment screw 28 as needed; installing the trigger extension 74 onto the trigger actuator 72 such that said trigger extension 74 protrudes up through the trigger opening portion 38 of the cradle 22; waiting a period of time for a fish to take the bait on the fishing line 105 causing the fishing rod 100 and rod holder tube 24 to be pulled downwardly causing said rod holder tube 24 to contact the trigger extension 74, thereby activating the trigger mechanism 70; activating the trigger mechanism 70 then releases the trigger cable 36 which allows the spring 82 to pull the rod holder assembly 20 into a vertical position to set the hook in a fish's mouth; loosening the rod tightening fastener 30; removing the fishing rod 100 from the rod holder tube 24; reeling in the fish in a conventional manner; and, benefiting from the automatic and accurate setting of a fishing hook in a fish's mouth afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A fishing rod holder for automatically setting a fish hook within a mouth of a fish, said fishing rod holder comprising:
   a base assembly;
   a trigger mechanism mounted to said base assembly;
   a rod holder assembly attached to said base assembly, said rod holder assembly being releasably connected to said trigger mechanism and further being capable of holding an existing fishing rod and further comprising:
      a cradle;
      a resistance band pivotally connected to said cradle and comprising an upwardly facing band opening for receiving said rod holder tube and a resistance band adjustment fastener engaged and passing through a wall portion of said cradle thereby contacting said resistance band in a perpendicular manner to open and close said band opening;
      a rod holder tube supported by said cradle and pivotally attached thereto; and,
      a fastener engaged and passing through an upper wall portion of said rod holder tube; and,
   an adjustment assembly attached to said base assembly and said rod holder assembly;
   wherein downwardly movement of said rod holder assembly unlocks said trigger mechanism;
   wherein said upwardly facing band opening receives said rod holder tube;
   wherein said rod holder tube is pulled downwardly until overcoming a resistance of said resistance band and thereafter enters said cradle;
   wherein said resistance band selectively adjusts an activation force for unlocking said trigger mechanism;
   wherein said resistance band adjustment fastener inwardly flexes a side portion of said resistance band and thereby enables said rod holder tube to travel downwardly through said band opening and into said cradle;
   wherein said resistance band selectively returns to an expanded form against an inner surface of said cradle as said resistance band adjustment fastener is displaced outwardly from said cradle; and,
   wherein said adjustment assembly displaces said rod holder assembly from an initial angled position relative to said base assembly to a vertical position relative to said base assembly after said trigger mechanism is unlocked.

2. The fishing rod holder of claim 1, wherein said rod holder assembly further comprises:
   a U-shaped trigger cable affixed to said cradle and handing downwardly therefrom; and,
   a U-shaped strap affixed to said cradle and looped around said rod holder tube.

3. The fishing rod holder of claim 1, wherein said base assembly comprises:
   a base plate;
   a plurality of first adjustable legs portions pivotally connected to said base plate;

a plurality of second adjustable legs portions pivotally connected to said base plate and said first adjustable leg portions respectively; and, wherein said first and second adjustable leg portions cooperate to elevate a front portion of said base assembly and said rod holder assembly.

4. The fishing rod holder of claim 2, wherein said trigger mechanism comprises:

a locking mechanism;

a trigger extension extending upwardly through a bottom portion of said cradle; and, a trigger actuator in communication with said locking mechanism and said trigger extension respectively;

wherein said trigger cable is removably connected to said locking mechanism and thereby downwardly anchors said rod holder assembly in a ready position;

wherein downward convergence of said rod holder tube into said cradle causes mechanical contact between said rod holder tube and said trigger extension thereby downwardly urging said trigger actuator to unlock said locking mechanism; and, wherein said trigger cable is released when said trigger mechanism is unlocked and thereby allows said rod holder assembly to pivot upwardly.

5. The fishing rod holder of claim 1, wherein said adjustment assembly comprises:

an anchoring bracket;

an eyebolt adjustably attached to said anchoring bracket;

a spring attached to said eyebolt; and, a tension cable attached to said spring and said cradle respectively;

wherein said spring powers an upward pivoting motion of said rod holder assembly when said trigger mechanism is unlocked.

6. A fishing rod holder for automatically setting a fish hook within a mouth of a fish, said fishing rod holder comprising:

a base assembly;

a trigger mechanism mounted to said base assembly;

a rod holder assembly pivotally attached to said base assembly, said rod holder assembly being releasably connected to said trigger mechanism and further being capable of holding an existing fishing rod and further comprising:

a cradle;

a resistance band pivotally connected to said cradle and comprising an upwardly facing band opening and a resistance band adjustment fastener engaged and passing through a wall portion of said cradle thereby contacting said resistance band in a perpendicular manner to open and close said band opening;

a rod holder tube supported by said cradle and pivotally attached to thereto; and, a fastener engaged and passing through an upper wall portion of said rod holder tube; and, an adjustment assembly attached to said base assembly and said rod holder assembly;

wherein downwardly movement of said rod holder assembly unlocks said trigger mechanism;

wherein said upwardly facing band opening receives said rod holder tube;

wherein said rod holder tube is pulled downwardly until overcoming a resistance of said resistance band and thereafter enters said cradle;

wherein said resistance band selectively adjusts an activation force for unlocking said trigger mechanism;

wherein said resistance band adjustment fastener inwardly flexes a side portion of said resistance band and thereby enables said rod holder tube to travel downwardly through said band opening and into said cradle;

wherein said resistance band selectively returns to an expanded form against an inner surface of said cradle as said resistance band adjustment fastener is displaced outwardly from said cradle; and, wherein said adjustment assembly pivots said rod holder assembly from an initial angled position relative to said base assembly to a vertical position relative to said base assembly after said trigger mechanism is unlocked.

7. The fishing rod holder of claim 6, wherein said rod holder assembly further comprises:

a U-shaped trigger cable affixed to said cradle and handing downwardly therefrom; and, a U-shaped strap affixed to said cradle and looped around said rod holder tube.

8. The fishing rod holder of claim 6, wherein said base assembly comprises:

a base plate;

a plurality of first adjustable legs portions pivotally connected to said base plate;

a plurality of second adjustable legs portions pivotally connected to said base plate and said first adjustable leg portions respectively; and, wherein said first and second adjustable leg portions cooperate to elevate a front portion of said base assembly and said rod holder assembly.

9. The fishing rod holder of claim 7, wherein said trigger mechanism comprises:

a locking mechanism;

a trigger extension extending upwardly through a bottom portion of said cradle; and, a trigger actuator in communication with said locking mechanism and said trigger extension respectively;

wherein said trigger cable is removably connected to said locking mechanism and thereby downwardly anchors said rod holder assembly in a ready position;

wherein downward convergence of said rod holder tube into said cradle causes mechanical contact between said rod holder tube and said trigger extension thereby downwardly urging said trigger actuator to unlock said locking mechanism; and, wherein said trigger cable is released when said trigger mechanism is unlocked and thereby allows said rod holder assembly to pivot upwardly.

10. The fishing rod holder of claim 6, wherein said adjustment assembly comprises:

an anchoring bracket;

an eyebolt adjustably attached to said anchoring bracket;

a spring attached to said eyebolt; and, a tension cable attached to said spring and said cradle respectively;

wherein said spring powers an upward pivoting motion of said rod holder assembly when said trigger mechanism is unlocked.

* * * * *